June 27, 1950  W. J. SMITH ET AL  2,512,691
UNIVERSAL JOINT
Filed May 20, 1946

INVENTORS
William J. Smith
William W. Slaght
BY
Evans + McCoy
ATTORNEYS

Patented June 27, 1950

2,512,691

UNITED STATES PATENT OFFICE 2,512,691

UNIVERSAL JOINT

William J. Smith and William W. Slaght, Rocky River, Ohio, assignors to Cleveland Steel Products Corporation, Cleveland, Ohio, a corporation of Ohio Application May 20, 1946, Serial No. 671,001

3 Claims. (Cl. 64—17)

This invention relates to universal joints and more particularly to a releasable fastening for pivot members mounted in the yoke arms of such joints.

The invention has for its object to provide a universal joint in which the pivotal connections are securely locked in place but in which the locking means is readily accessible and removable so that the joint can be quickly and easily taken apart when desired.

A further object is to provide a pivot retainer in the form of a clip that can be driven into place by tapping with a hammer and which when once in place is securely locked against accidental displacement.

An additional object is to provide a resilient retainer clip that is adapted to snap into locking engagement with a portion of the pivot member and which may be quickly dislodged by a suitable tool when desired.

With the above and other objects in view, the invention may be said to comprise the device as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
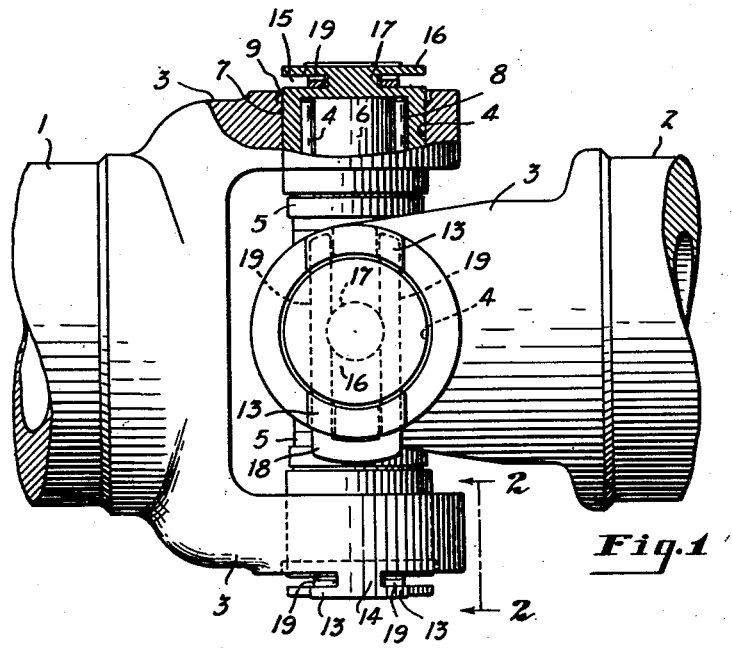
Figure 1 is a side elevation of a universal joint embodying the invention with one of the yoke arms of the joint broken away and shown in section.
Figure 3:
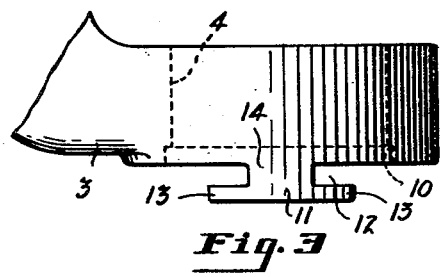
Fig. 3 is a fragmentary elevation showing a yoke arm with pivot members omitted.

The present invention is primarily concerned with the mounting of pivot members in the yokes of universal joints and to the retaining means for such members. In the accompanying drawings the invention is shown applied to a universal joint of a conventional type in which yoke members 1 and 2 have arms 3 provided with pivot receiving openings 4 which receive suitable pivot members which connect the yoke arms to a spider 5. As shown in Fig. 1, the pivot members comprise radially disposed trunnions 6 carried by the spider 5 that extend into the openings 4 of the yoke arms 3 and bearing cups 7 mounted in the openings 4 of the yoke arms in which the trunnions are journaled, the cups 7 being preferably provided with anti-friction bearing rollers 8. The openings 4 are enough larger in diameter than the trunnions 6 to permit the spider to be positioned between the arms of the yokes with its trunnions 6 extending into the openings 4 of the yoke arms. With the spider so positioned, the cups 7 are inserted into the outer ends of the openings 4 and onto the ends of the trunnions 6. When secured in place the bearing cups 7 serve to center the spider with respect to the arms and the trunnions with respect to the openings in the arms. Counterbores 9 may be provided in the outer ends of the openings 4 to facilitate the insertion of the cups 7 into the opening.

The outer face of the arm 3 is provided with projections 11 bordering the opening 4 on diametrically opposite sides thereof. The opposite sides of the projections 11 are undercut to provide outwardly facing channels 12 and retaining flanges 13. The bottoms of the channels of each projection 11 are alined with the bottoms of channels of the projection on the opposite sides of the opening, the channels of each of the two projections being separated by a web portion 14 to which the flanges 13 are joined.

Figure 2:
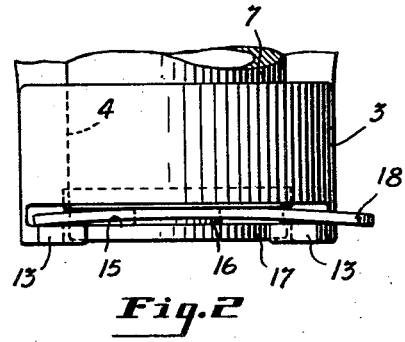
Fig. 2 is an elevational view looking toward the end of the yoke arm as indicated at 2—2 in Fig. 1.
Figure 4:
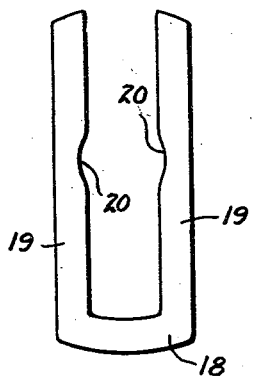
Fig. 4 is a plan view of the retaining clip.
Figure 5:
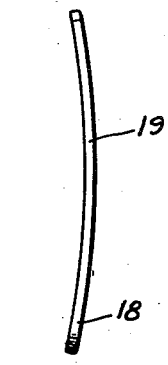
Fig. 5 is a side elevation of the clip shown in Fig. 4.

The pivot member 7 has a circumferential channel 15 adjacent its outer end that provides a circumferential retaining flange 16 and an axial projection on the end of the pivot member in the form of a restricted neck portion 17 of a diameter slightly greater than the thickness of the webs 14 that joins the flange 16 to the body of the pivot member. The channel 15 is adapted to register with the channels 12 of the arm when the pivot member is seated against the shoulder 10. The pivot member is locked in place by means of a resilient sheet metal retaining clip 18 which is of substantially U-shape having spaced parallel arms 19 that are adapted to straddle the webs 14 and enter the registering channels 12 and 15 to lock the pivot member 7 in place. The space between the arms 19 is slightly less than the diameter of the axial projection 17 so that when the clip is driven into place the free ends of the arms 19 are spread apart sufficiently to permit them to pass over the projection 17. Recesses 20 are provided on the inner edges of the arms 19 for engagement with the neck portion 17 so that the arms 19 will snap into locking engagement with the neck portion 17 when the clip is driven into locking position. The clip 18 is longitudinally bowed so that when the clip is in its locking position as shown in Fig. 2 the end portions of the clip will press outwardly against the retaining flanges 13 and the central portion of the clip will press inwardly against the body of the pivot member 7 to yieldably hold the pivot member in the opening 4.

It is to be understood that variations and modifications of the specific device herein shown and described for purposes of illustration, may be made without departing from the spirit of the invention.

What we claim is:

1. In a universal joint, a yoke arm having a pivot receiving opening and arcuate projections on its outer face bordering diametrically opposite sides of the opening, said projections having outwardly facing channels providing retaining flanges extending from central webs, a pivot member in said opening having a circumferential channel adjacent its outer end registering with the first mentioned channels, said circumferential channel providing a retaining flange on the end of the pivot member and a restricted neck portion joining the flange to the body of the pivot portion, said neck portion having a diameter slightly greater than the thickness of said webs, and a U-shaped sheet metal retaining clip securing said member in said opening, said clip having spaced resilient arms positioned in the registering channels and straddling said webs and said neck portion, the space between said arms being less than the diameter of said neck portion and said arms having neck receiving recesses in their inner edges.

2. In a universal joint, a yoke arm having a pivot receiving opening and arcuate projections bordering diametrically opposite sides of the opening, said projections having outwardly facing channels providing retaining flanges extending in opposite directions from central webs, a bearing cup fitting in said opening and having a circumferential channel registering with the first mentioned channels and providing an axial projection adapted to be alined with said webs, and a sheet metal clip securing said cup in said opening, said clip having resilient arms normally spaced apart a distance less than the diameter of said axial projection and positioned in said registering channels and straddling said axial projection and said webs, said arms having recessed inner edges for engagement with said projection.

3. In a universal joint, a yoke arm having a pivot receiving opening and arcuate projections bordering diametrically opposite sides of the opening, said projections having outwardly facing channels providing retaining flanges extending in opposite directions from central webs, a bearing cup fitting in said opening and having an axial projection at its outer end provided with a circumferential retaining flange spaced from the body of the cup to form a circumferential channel registering with the first mentioned channels, and a resilient U-shaped sheet metal clip securing said cup in said opening, said clip having arms positioned in said registering slots and straddling said web and said projection, said clip being longitudinally bowed and having a central portion that exerts an axial thrust on said cup when the clip is in locking position with its ends engaging the inner sides of said retaining flanges and its central portion engaging said cup, said arms having inner edges spaced apart a distance less than the diameter of said axial projections and recessed, said recessed arms having locking engagement with said axial projection.

WILLIAM J. SMITH.
WILLIAM W. SLAGHT.

REFERENCES CITED

The following references are of record in the file of this patent:

UNITED STATES PATENTS

| Number | Name | Date |
|---|---|---|
| 639,337 | Anthony | Dec. 19, 1899 |
| 1,993,357 | Braun et al. | Mar. 5, 1935 |
| 2,032,497 | Padgett | Mar. 3, 1936 |